United States Patent [19]

Johnston et al.

[11] 4,037,807
[45] July 26, 1977

[54] FLIGHT VEHICLE

[75] Inventors: Thomas Johnston, Belfast 5; Frederick Peter Youens, Holywood, County Down, both of Northern Ireland

[73] Assignee: Short Brothers and Harland Limited, Belfast, Northern Ireland

[21] Appl. No.: 588,882

[22] Filed: June 20, 1975

Related U.S. Application Data

[63] Continuation of Ser. No. 393,231, Aug. 30, 1973, abandoned.

[30] Foreign Application Priority Data

Sept. 1, 1972 United Kingdom ............... 40721/72

[51] Int. Cl.² .............................................. B64C 29/02
[52] U.S. Cl. .................................... 244/7 B; 244/12.1; 244/34 A
[58] Field of Search ................. 244/12 R, 12 C, 7 R, 244/7 B, 34 A, 17.11, 23 R, 23 C; 46/74 D, 75, 76 R; D12/79

[56] References Cited
U.S. PATENT DOCUMENTS

| | | | |
|---|---|---|---|
| 2,907,536 | 10/1959 | Von Zborowski | 244/12 R |
| 2,952,422 | 9/1960 | Fletcher et al. | 244/12 C |
| 2,969,936 | 1/1961 | Dorman et al. | 244/24 A X |
| 3,017,139 | 1/1962 | Binder | 244/34 A X |
| 3,049,320 | 8/1962 | Fletcher | D12/79 X |
| 3,107,883 | 10/1963 | Haberkorn | 244/34 A |
| 3,108,764 | 10/1963 | Sudrow | 244/34 A X |
| 3,128,062 | 4/1964 | Brocard | 244/23 C |
| 3,420,472 | 1/1969 | Boudes | 244/7 B |

*Primary Examiner*—Trygve M. Blix
*Assistant Examiner*—Barry L. Kelmachter
*Attorney, Agent, or Firm*—Cushman, Darby & Cushman

[57] ABSTRACT

A flight vehicle comprises a vehicle body with a duct having a longitudinal axis extending through the body, and a fan for inducing a flow of ambient air through the duct from an inlet end to an outlet end to provide a thrust acting along the axis of the duct. A system of control is provided for varying the attitude of the vehicle without re-directing or substantially re-directing the thrust whereby the vehicle is capable of controlled flight from a take-off mode in which the axis of the duct is vertical or substantially vertical, to a forward flight mode in which the axis of the duct is inclined to the vertical. A pair of wings are provided on the outer surface of the body, the wings being on opposite sides of the body and having no or substantially no dihedral.

20 Claims, 7 Drawing Figures

FLIGHT VEHICLE

This application is a copending continuation of our application Ser. No. 393,231, filed Aug. 30, 1973, which was abandoned upon the filing of this application.

The present invention relates to flight vehicles.

According to the present invention there is provided a flight vehicle comprising a vehicle body with a duct having a longitudinal axis extending through the body, flow induction means for inducing the flow of ambient air through the duct from an inlet end to an outlet end to provide a thrust acting along the axis of the duct, and control means for varying the attitude of the vehicle without re-directing or substantially re-directing the thrust whereby the vehicle is capable of controlled flight from a take-off mode in which the axis of the duct is vertical or substantially vertical, and a forward flight mode in which the axis of the duct is inclined to the vertical, wherin a pair of wings are provided on the outer surface of the body, the wings being on opposite sides of the body and having no or substantially no dihedral.

An embodiment of the invention will now be described by way of example only with reference to the accompanying drawings in which.

Figure 1:
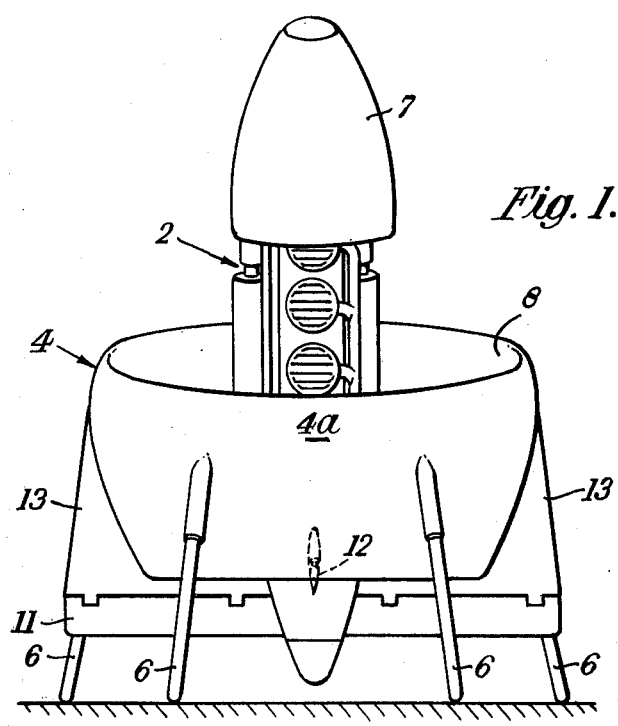
FIG. 1 is a front elevation of a flight vehicle according to the invention in a take-off attitude.

Referring now to the drawings a flight vehicle in the form of a drone includes a fan 1 having fan blades 1a and driven by an internal combustion engine 2 e.g. a piston or turbine engine, and the fan 1 is mounted symmetrically within a cylindrical duct 3 defined by an annular shroud 4, which constitutes the body of the vehicle. The fan 1 and engine 2 are supported within the duct 3 by radially extending arms 5, the engine 2 being arranged above the fan 1 and the fan 1 rotating on the logitudinal axis A of the duct 3. Legs 6 are secured to the shroud 4 to support the vehicle on the ground or on a load bearing substrate, in such a position that the longitudinal axis A of the duct 3 is vertical. A fuel tank (not shown) is provided within an aerodynamic nose cone 7 arranged above the engine 2.

Figure 2:
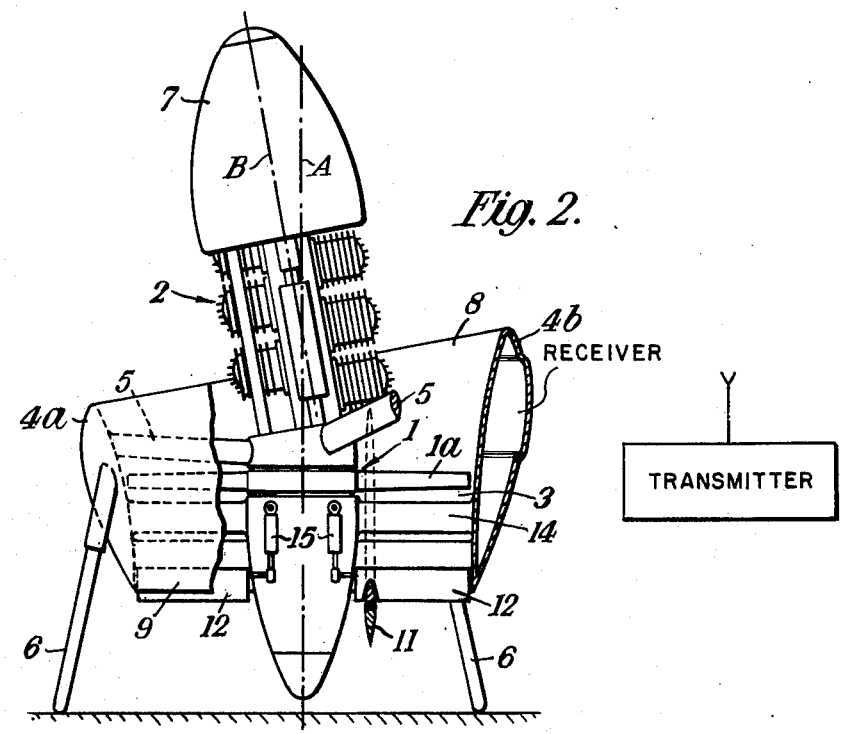
FIG. 2 is a part sectional side elevation of the flight vehicle shown in FIG. 1.
Figure 3:
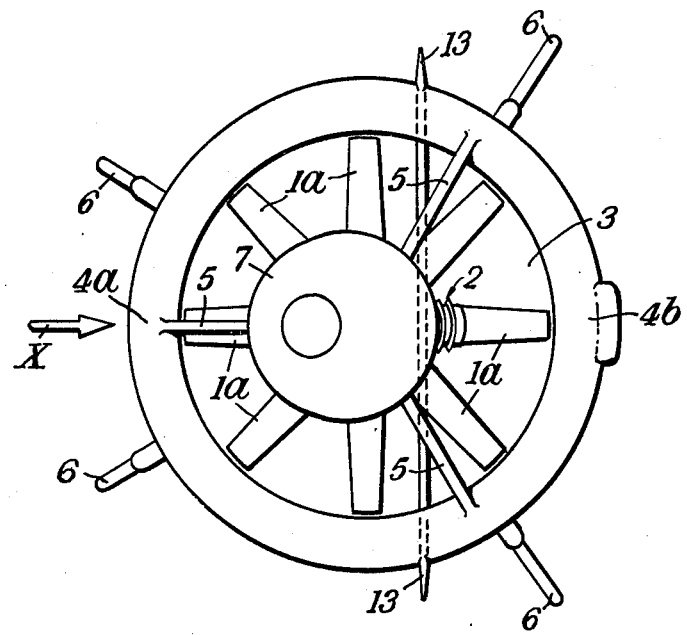
FIG. 3 is a plan view of the flight vehicle shown in FIGS. 1 and 2.

The shroud 4, as will be seen from FIG. 2, is of double walled construction which has a cross sectional profile in the form of an aerofoil. When the fan 1 is brought into operation it acts to draw ambient air into the inlet 8 of the duct 3 and cause it to flow through the duct 3 and from the outlet end 9 of the duct 3 to provide a lifting or propulsive thrust.

The front part 4a of the shroud 4 is of shorter axial length than the rear part 4b so that with the axis A of the duct verical, the plane of the inlet of the duct is inclined downwardly towards the front part 4a of the shroud 4. This improves the efficiency of the air intake in forward flight.

The upper edge of the shroud 4 surrounding the inlet end 8 of the duct 3 is smoothly contoured to allow a smooth flow of air over the shroud in to the intake. Dependent on the design of the vehicle the duct 3 may increase or decrease in diameter at the outlet end 9.

Control surfaces are provided extending across the outlet end 9 of the duct 3. These take the form of a pitch control surface 11 which extends laterally from side to side across the outlet end 9 of the duct 3 and which is pivotal about a first axis, and two roll and yaw control surfaces 12 lying one on each side of the pitch control surface 11 at right angles thereto. The control surfaces 12 are pivotal about a second axis at right angles to the first axis and are movable both differentially and symmetrically for roll and yaw control.

It will be realized that each control surface may be replaced by a set of small control surface elements which are capable of both symmetrical and differential movement.

Wings 13 defining a complete wing of the vehicle are provided on opposite sides of the shroud 4 as shown in FIG. 2 these wings 13 have highly swept leading edges and trailing edges normal to the airstream as in a delta wing, and the pitch control surface 11 extends along the trailing edge of the complete wing. When the vehicle is standing upright on the legs 6 such that the axis A of the duct 3 is vertical, the wings 13 lie in the same vertical plane and consequently have no dihedral. The vertical plane in which the wings 13 lie is off-set from the axis A of the duct. The wings 13 are also of planar configuration and both faces of the wings 13 are flat. Alternatively the wings may have an aerofoil cross-section. The complete wing defined by the wings 13 has a low aspect ratio, preferably less than 3.

A series of radial stator blades 14 are arranged below the fan blades 1a to remove swirl from the airflow induced through the duct 3, and thereby reduce the tendency of the vehicle to rotate about the axis A of the duct 3. Further control to prevent rotation may be provided by the control surfaces 12. Instead of the stator blades 14 a contra-rotating fan may be used.

The control surfaces 11 and 12 are driven by actuators 15, only two of which are shown in FIG. 2, and the actuators 15 are controlled by an electro-mechanical control apparatus (not shown) including a receiver (see FIG. 2) which is operative to receive control signals from a remote transmitter (see FIG. 2) and control the actuators 15 in response thereto. The electronic control apparatus is also used to conrol the fan speed and may be housed in the double wall structure of the shroud 4.

It will be seen from FIG. 2 that the longitudinal axis B of the engine 2 is inclined with respect to the axis A of the duct 3. This is to ensure that the centre of gravity of the vehicle is displaced in a forward direction from the axis A of the duct 3, for a purpose to be described later and so that the aerodynamic nose cone 7 is more in alignment with the air flow passing into the duct 3. Furthermore, the engine 2 is mounted above the fan 1 to raise the centre of gravity of the vehicle such that it is in the region of the level of the inlet end 8.

In operation the fan 1 is driven to rotate by the engine 2 thereby inducing a flow of ambient air through the duct 3 to produce a vertically acting propulsive thrust which lifts the vehicle off the ground or load bearing substrate. The remote transmitter is then operated to provide a demand signal to actuate the control surfaces 11, 12 to tilt the vehicle. The offset centre of gravity of the vehicle reduces the control power required to trim the vehicle. In this forward tilted position the axis of the duct and the direction of action of the propulsive thrust are inclined to the vertical and the vehicle is propelled forward and upwards. The arrangement of the duct inlet end 8 is such that when the vehicle is moving forward at a high altitude the air flows more easily into the duct 3.

It should be also pointed out that because of the smooth shape of the upper edge of the shroud, the airflow over this edge causes a suction effect which so produces an upward lift on the shroud 4. Because the centre of gravity of the vehicle is also in the region of the inlet end 8 of the duct 3, the momentum drag force due to air being sucked into the duct 3 is arranged to act through or nearly through the centre of gravity, thereby eliminating any substantial moment effect from this drag force tending to rotate the vehicle and make it difficult to control.

As forward flight proceeds aerodynamic forces due to the forward movement of the vehicle act on the shroud 4 to produce lift and the attitude of the vehicle is increasingly adjusted by the pitch control surface 11 as forward speed increases to bring the axis A of the duct 3 to near horizontal, for example to within 10° of horizontal. At this attitude a major proportion of the propulsive thrust acts to propel the vehicle in a forward direction and the maximum speed in a level flight mode is achieved.

The vehicle is capable of landing and taking-off vertically and the flight regime is continuous from zero speed to a maximum, and lateral and backward speeds are available. The vehicle is also capable of diving, and a maximum speed would be achieved in a vertical dive.

The continuous flight regime stems from the fact that the primary source of lift and propulsive thrust, i.e. the fan 1, operates at all speeds to produce lift and thrust, the attitude of the vehicle being progressively decreased with increase in forward speed. When the vehicle is moving forward aerodynamic forces are produced on the external surface of the vehicle and these aerodynamic forces on the body and wings provide lift. However, as the vehicle speed increases the aerodynamic forces increase allowing the vehicle to be increasingly tilted towards a horizontal orientation whereby more of the propulsive thrust is utilized to propel the vehicle in a forward direction, that is the horizontal component of the thrust is increased.

There is however no defined change-over from maintaining the vehicle airborne wholly by the propulsive thrust to maintaining it airborne mainly by the aerodynamic forces on the outside of the shroud 4 and wings 13. This is due to the gradual growth of the aerodynamic forces on the outside of the shroud 4 and wings 13.

When the vehicle is flying in a forward direction in steady or manoeuvering flight the airflow around the shroud 4 produces moments on the vehicle. These must be counteracted by the control surfaces to maintain the vehicle in the steady or manoeuvering flight.

The size of the forces or moments on the shroud 4 is dependent on the pattern of the airflow moving in the direction around the shroud 4. As the attitude or speed of the vehicle is changed the pattern of the airflow around the outside of the shroud 4 may suddenly change causing a large or sudden change in the forces or moments on the vehicle. This sudden change in force or moment on the vehicle can be extremely difficult to control, and unless it is controlled, the vehicle may become completely unstable and uncontrollable.

In this respect the wings 13 on either side of the shroud 4 are designed to produce, in combination with the shroud 4, acceptable force and moment characteristics. This is achieved because the type of air-flow produced by a wing having a highly swept leading edge tends to be consistent over a large range of incidence and, not to change suddenly, and because the position and proportions of the wings 13 in relation to the shroud 4 can be arranged to produce acceptable overall characteristics i.e. for example, the pitching moments on the vehicle can be arranged such that they can be more easily controlled. They ensure that there is no sudden change in the pattern of the airflow around the shroud and therefore ensure that changes in force or moment which act to render the vehicle unstable with speed or change of attitude, become smaller, and more gradual, thereby easing the problem of controlling the vehicle.

Figure 5:
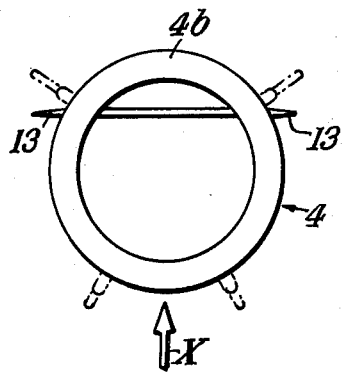
FIG. 5 is a plan view of a body for a flight vehicle having a different positioning of the wing.

In the vehicle shown in FIGS. 1 to 4 the wings are provided on opposite sides of the vehicle body 2 as shown in plan and are arranged in a vertical plane close to the axis of the duct. These wings 13 may however be displaced towards the rear 4b of the vehicle body 2 as shown in FIG. 5. Furthermore, the trailing edges of the wings 13 may be arranged to be movable and thereby act as control surfaces. When the vehicle is flying with the axes of the duct 3 horizontal, or substantially horizontal, a significant amount of lift may also be achieved on the delta wings 13.

Although the embodiment described in FIGS. 1 to 4 the wings 13 have no dihedral they may have a small dihedral, for example up to a maximum of about 20°, and still operate effectively to stablilize the vehicle at low speeds and high attitudes. Furthermore although with the axis A of the duct vertical the wings 13 lie in a vertical plane they may lie in a plane whch is inclined at, for example a maximum of about 10°, to the vertical.

Figure 6:
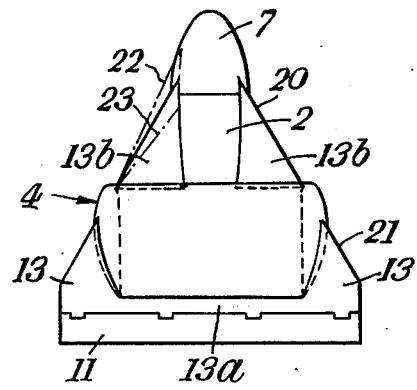
FIG. 6 is a rear elevation of a vehicle body for a flight vehicle incorporating an alternative wing formation.
Figure 7:
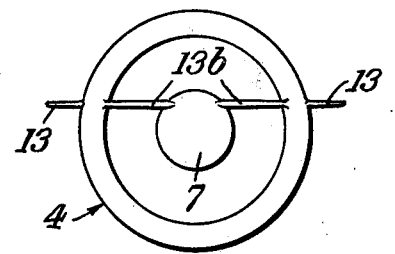
FIG. 7 is a plan view of the vehicle body shown in FIG. 6.
Figure 4:
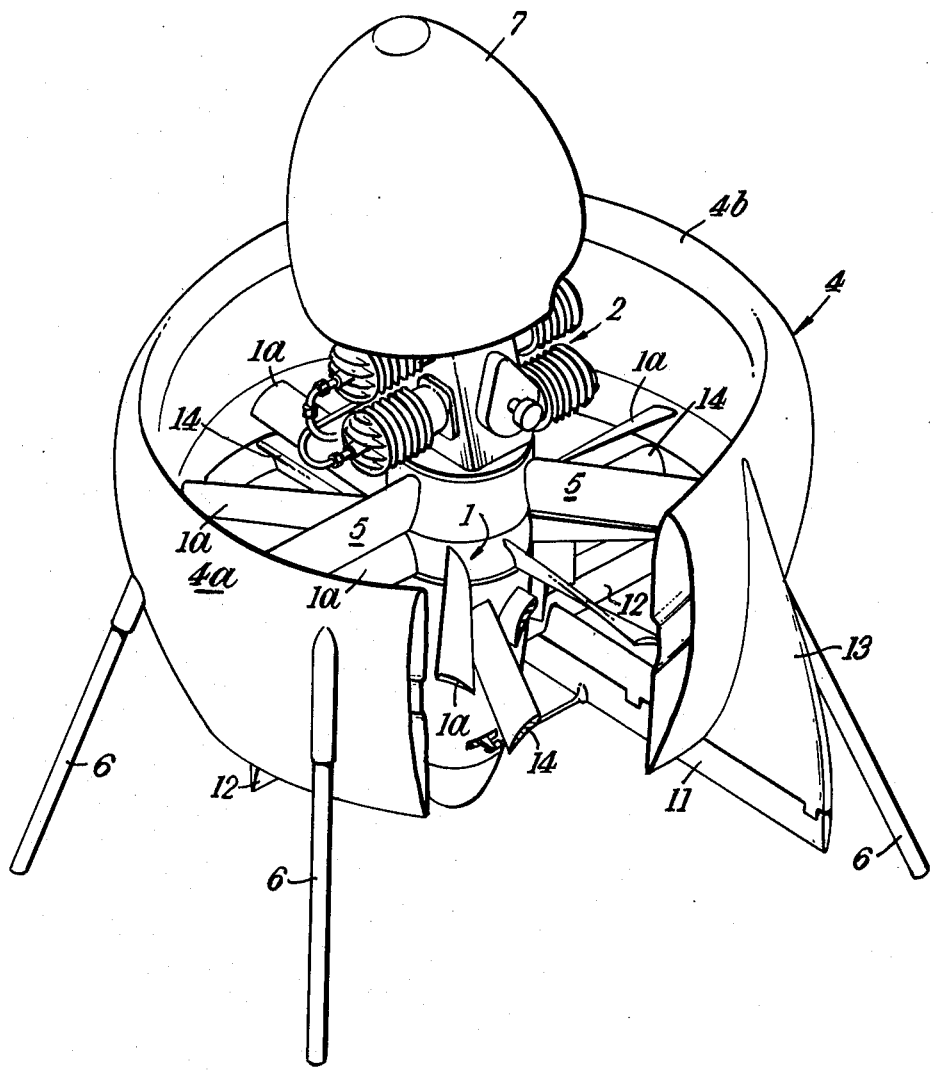
FIG. 4 is a part sectional perspective view of the flight vehicle shown in FIGS. 1, 2 and 3.

In an alternative arrangement illustrated in FIGS. 6 to 7 the trailing edges of the wings 13 extend well below the outlet end 9 of the duct 3 and are joined by an integral cross piece 13a which extends across the outlet end 9. The pitch control surface 11 is secured to the trailing edge of the wings 13. The wings 13 also have forward extensions 13b which extend beyond the inlet end 8 of the duct 3 and are secured to the centre body supporting the fuel tank 7 and motor 2 forming effectively a full delta shape. Although in the arrangement illustrated in FIG. 6 the side edge 20 of the extension 13b is swept to the same degree as the side edge 21 of the wing 13 on the side of the shroud 4, it may be swept to a greater or lesser degree as indicated by the dotted lines 22 and 23.

In order to increase the forward velocity of the vehicle it is necessary to increasingly tilt the vehicle to a horizontal orientation to increase the horizontal component of the propulsive thrust. Where no control surfaces are provided on the external surface of the shroud 4, or at low forward speeds, deflection of the pitch control surface 11 in the airflow passing from the duct produces a force on the control surface 11, which produces a movement on the vehicle acting to tilt it. Rolling and yawing are controlled by the control surfaces 12, and where the vehicle is required to hover the movement due to the offset centre of gravity of the vehicle is counteracted by deflecting the pitch surface 11 in the airflow. Where, however, external control surfaces are provided on the external surface of the shroud 4, tilting, rolling and yawing may at higher speeds be controlled by controlling the aerodynamic forces acting on the shroud using the external control surfaces.

It should be understood that although the control surfaces are shown extending laterally across the outlet end 9 of the duct, they may be provided across one edge of the outlet end 9, if for example the outlet is provided with a flat edge, or is square.

The thrust available for the vehicle may be considered in two parts, the gross thrust produced by the fan 1 and the momentum drag of the intake air. These two components operate at an angle with respect to one another dependent on the attitude of the vehicle with respect to its path through the air. Where the gross thrust is significantly larger than the net thrust available for propelling the vehicle, significant lift may be generated by the vertical component of the gross thrust without reducing unacceptably the horizontal component. Thus provided that a reasonable overall efficiency in terms of power required to produce the net thrust, and where the mass flow rate of the air through the duct 3 is relatively large, large lifting forces which can substantially support the vehicle can be produced at moderate power.

The moderate power required to drive the fan and the low pressure ratio across the fan are achieved by utilizing a large mass flow rate. The propulsive thrust produced by the fan is therefore provided by utilizing large mass flow rates of air rather than using a high velocity airflow. By increasing the diameter of the duct 3 towards the outlet end 9, downstream of the fan 1, the air is allowed to expand behind the fan allowing more air to be drawn in. This significantly increases the mass flow rate of the air through the duct.

Although it was stated earlier that in order to increase the forward speed of the vehicle, it is tilted to increase the horizontal thrust component, it will be clear that this component may also be increased by increasing the power output of the fan 1.

Further control over the propulsive thrust produced by the airflow through the duct 3 may be achieved by providing a variable area outlet for the duct 3 for increasing or decreasing the area of the outlet. This may be done, for example by providing the shroud at the outlet end 9 of the duct with segments which can pivot inwardly or outwardly, by providing an axially movable conical centre body in the outlet, or by providing a flexible skirt around the outlet end 9 of the duct 3.

Although the vehicle has been described in the form of a drone, it may also be adapted for manned flight.

The vehicle of the present invention having the wings 13 on the side has advantages over shrouded rotor or annular wing vehicles not having such wings in that:

1. The wings can be arranged to produce acceptable pitching moments over a large range of incidence of the vehicle.

1. The wings produce an increased efficiency in forward flight, by virtue of the extra lift which they produce.

The vehicle may be considered to be an amalgamation of a shrouded rotor which gives good performance in hover and at very low speeds, and a delta or low aspect ratio wing which gives good performance at higher speeds. Thus the vehicle is capable of operating efficiently over a range of forward flight speeds from zero upwardly.

The vehicle has further considerable advantages over vehicles with unshrouded rotors in that:

a. the diameter of the fan can be kept small because of the beneficial effect of the shroud on the thrust produced by the fan at low and zero forward speeds.

b. the vehicle is not subject to speed limitations which arise with helicopters due to the relatively high forward speed of the advancing blade.

c. the vehicle, having a small diameter fan, is fundamentally suited to higher speeds.

d. the rotational energy due to the mass of the fan is small so that the propulsive thrust on landing can be destroyed almost instantaneously on cutting out the engine. This simplifies the problem of landing the vehicle, especially a drone, in high winds.

e. The shroud around the fan shields the fan blades from coming into contact with any external surface. Thus rolling over when landng need not result in serious damage, and hazards to operating personnel are reduced. This is particularly important where the vehicle is a drone.

f. because the fan is shrouded the vehicle may be landed in a net. This is particularly important when the vehicle is used for a shipborne application.

We claim:

1. A flight vehicle comprising a duct of aerofoil cross-section which provides lift with the vehicle in a forward flight mode;

flow induction means for inducing a flow of ambient air through the duct to provide a thrust greater than the weight of the vehicle, which thrust acts along the axis of the duct to enable the vehicle to take-off with the axis of the duct vertical; and means for controlling the attitude of said vehicle, said control means including adjustable control surfaces located in the flow of ambient air induced by the flow induction means to counteract moments produced on the vehicle by forward flight without substantial re-direction of the thrust by the control surfaces, and wings mounted on opposite sides of the outer surface of the duct and having trailing ends extending beyond the outlet end of the duct, the wings extending into the air stream around the outer surface of the duct in at least one plane generally parallel to the duct axis to modify the air flow around the outer surface of the duct to reduce pitching moments on the vehicle at high angles of incidence of the vehicle whereby the counteracting moments required from the control surfaces to overcome said pitching moments is reduced and the vehicle remains stable at such high angles of incidence, said wings also providing lift at low angles of incidence.

2. A flight vehicle as claimed in claim 1, wherein the dihedral of the wings is no more than 20°.

3. A flight vehicle as claimed in claim 1 wherein the wings together define a complete wing of the vehicle, and wherein the complete wing has a low aspect ratio.

4. A flight vehicle as claimed in claim 3 wherein the complete wing of the vehicle has an aspect ratio of less than 3.

5. A flight as claimed in claim 1 wherein the wings have a highly swept leading edge.

6. A flight vehicle as claimed in claim 1 wherein each wing has an extension which extends beyond the inlet end of the duct.

7. A flight vehicle as claimed in claim 1 wherein the wings of the vehicle define a delta shape.

8. A flight vehicle as claimed in claim 1 wherein the wings are of a planar configuration.

9. A flight vehicle as claimed in claim 1 wherein the wings have no dihedral and wherein, with the axis of the duct substantially vertical, the wings lie in the same vertical plane.

10. A flight vehicle as claimed in claim 9 wherein the said vertical plane is off set from the axis of the duct.

11. A flight vehicle as claimed in claim 1 wherein both faces of each wing are flat.

12. A flight vehicle as claimed in claim 1 wherein each wing is of aerofoil cross-section.

13. A flight vehicle as claimed in claim 1 wherein the control surfaces include a first pivotally mounted aerodynamic control surface which is so positioned at the outlet end of the duct that it is acted on by the air flow through the duct.

14. A flight vehicle as claimed in claim 13 wherein the first aerodynamic control surface extends across the trailing ends of the wings of the vehicle.

15. A flight vehicle as claimed in claim 13 wherein the control surfaces include a pair of second pivotally mounted aerodynamic control surfaces arranged on a common pivoting axis which is transverse to the pivoting axis of the first aerodynamic control surface, said second aerodynamic control surfaces being so positioned at the outlet end of the duct that they are acted on by the air flow through the duct, the second aerodynamic control surfaces being capable of differential and symmetrical pivoting movement.

16. A flight vehicle as claimed in claim 15 wherein the second aerodynamic control surfaces are on opposite sides of the first aerodynamic surface.

17. A flight vehicle as claimed in claim 15 wherein the pivoting axis of the first aerodynamic control surface is perpendicular to the pivoting axis of the second aerodynamic surfaces.

18. A flight vehicle as claimed in claim 13 wherein the control surfaces include a pair of second pivotally mounted aerodynamic control surfaces on a common pivoting axis which is transverse to the pivoting axis of the first aerodynamic control surface and wherein at least one of the first and second aerodynamic control surfaces comprises a set of control surface elements which are capable of symmetrical and differential pivotal movement.

19. A flight vehicle as claimed in claim 1 wherein the control means further includes a receiver which is operative to receive control signals from a remote transmitter and produce output signals in response thereto, and an actuator system operative to control the adjustable control surfaces in response to the output signals from the receiver.

20. A flight vehicle as claimed in claim 1 characterized in that the flow induction means comprising a fan and a motor for driving the fan.

* * * * *